United States Patent
Hunter

(10) Patent No.: US 7,205,996 B2
(45) Date of Patent: Apr. 17, 2007

(54) FULL-SCENE ANTI-ALIASING METHOD AND SYSTEM

(75) Inventor: Gregory M. Hunter, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 350 days.

(21) Appl. No.: 10/837,233

(22) Filed: Apr. 30, 2004

(65) Prior Publication Data

US 2004/0207634 A1 Oct. 21, 2004

Related U.S. Application Data

(62) Division of application No. 10/233,106, filed on Aug. 28, 2002, now Pat. No. 6,922,199.

(51) Int. Cl.
*G09G 5/00* (2006.01)

(52) U.S. Cl. .................. 345/582; 345/427; 345/611

(58) Field of Classification Search ............... None
See application file for complete search history.

(56) References Cited

U.S. PATENT DOCUMENTS

| | | | |
|---|---|---|---|
| 5,701,405 A | 12/1997 | Kelley et al. ............... 395/141 |
| 5,867,166 A | 2/1999 | Myhrvold et al. ........... 345/419 |
| 5,959,598 A | 9/1999 | McKnight .................... 345/90 |
| 5,990,904 A | 11/1999 | Griffin ........................ 345/435 |
| 6,038,031 A * | 3/2000 | Murphy ...................... 382/254 |
| 6,133,901 A | 10/2000 | Law ............................ 345/136 |
| 6,249,287 B1 | 6/2001 | Yamrom ...................... 345/419 |
| 6,252,608 B1 | 6/2001 | Snyder et al. .............. 345/473 |
| 6,259,457 B1 * | 7/2001 | Davies et al. ............... 345/629 |
| 6,278,434 B1 | 8/2001 | Hill et al. .................... 345/127 |
| 6,300,956 B1 | 10/2001 | Apodaca et al. ............ 345/433 |
| 6,459,428 B1 | 10/2002 | Burk et al. .................. 345/419 |
| 6,496,186 B1 | 12/2002 | Deering ...................... 345/419 |
| 6,496,187 B1 | 12/2002 | Deering et al. ............. 345/419 |
| 6,501,483 B1 | 12/2002 | Wong et al. ................. 345/611 |
| 6,650,323 B2 | 11/2003 | Naegle et al. .............. 345/419 |
| 6,697,063 B1 | 2/2004 | Zhu ............................ 345/421 |
| 6,731,301 B2 | 5/2004 | Sato et al. ................... 345/613 |
| 6,828,983 B1 | 12/2004 | Vijayakumar et al. ...... 345/613 |
| 7,071,949 B1 | 7/2006 | Drucker et al. ............. 345/582 |
| 2002/0140706 A1 | 10/2002 | Peterson et al. ............ 345/611 |
| 2003/0043169 A1 | 3/2003 | Hunter ........................ 345/611 |

OTHER PUBLICATIONS

Beets, "Super-sampling Anti-aliasing Analyzed", 2000, 3dfx, pp. 1-22.*

(Continued)

*Primary Examiner*—Mark Zimmerman
*Assistant Examiner*—Kevin Xu
(74) *Attorney, Agent, or Firm*—Dorsey & Whitney LLP

(57) ABSTRACT

A method and system for performing full-scene anti-aliasing for an image through a technique of rotating and unrotating rasterization of a scene and rendering a resulting image. A scene is rasterized at a first angle relative to a first coordinate system to generate a plurality of pixels, which are then applied to a polygon surface that is rendered at a second angle equal to the inverse of the first angle. Thus, the resulting image is re-oriented with respect to the first coordinate system.

19 Claims, 5 Drawing Sheets

OTHER PUBLICATIONS

Abrash, M., "Inside Xbox Graphics", Dr. Dobb's Journal: Software Tools for the Professional Programmer, vol. 25, No. 8, Aug. 2000, pp. 21-26.

Author Unknown, "BB Scunthorpe—Four Queens Busy", Steel Times, vol. 223, No. 2, Feb. 1995, pp. 70-71.

Beets, Kristof et al., "Super-sampling Anti-aliasing Analyzed", Beyond3D, (2000) pp. 1-22, <http://www.Beyond3D.com>.

Bowers, G., "Reconstruction and Repair of Blast Furnaces", Metal Construction and British Welding Journal, Aug. 1970, pp. 317-321.

Brabham, M., "The Unusual Suspects", www.insidelectronics.com, Mar./Apr. 2000, pp. 15-16.

Ding, J. et al., "Aliasing-Free Space and Time Compactions with Limited Overhead", IEEE 2000 First International Symposium on Quality Electronic Design, Mar. 2000, pp. 355-360.

Dippe, M.Z., et al. "Antialiasing Through Stochastic Sampling," Department of Electrical Engineering and Computer Sciences, University of California, vol. 19, No. 3, Nov. 1985, pp. 69-78.

Ewins, J. et al., "Implementing An Anisotropic Texture Filter" Computers & Graphics 24 (2000), pp. 253-267.

Hart, J. et al., "Antialiased Parameterized Solid Texturing Simplified for Consumer-Level Hardware Implementation", Proceedings of the Eurographics/SIGGRAPH Workshop on Graphics Hardware, Los Angeles, California, Aug. 1999, pp. 45-53, 140.

Horita, K. et al., "Advanced Shallow Trench Isolation to Suppress the Inverse Narrow Channel Effects for 0.24μm Pitch Isolation and Beyond", Symposium on VLSI Technology, Digest of Technical Papers, Jun. 2000, pp. 178-179.

Igehy, H., "Tracomg Ray Differentials", Computer Graphics, Proceedings, Annual Conference Series 1999, Siggraph 99, Conference Proceedings, Aug. 1999, pp. 179-186.

Jouppi, N. et al., "$Z^3$: An Economical Hardware Technique for High-Quality Antialiasing and Transparency", Proceedings of the Eurographics/SIGGRAPH Workshop on Graphics Hardware, Los Angeles, California, Aug. 1999, pp. 85-93, 143.

Keating, B., "Efficient Shadow Antialiasing Using an A-Buffer", Journal of Graphics Tools, vol. 4, No. 3, 1999, pp. 23-33.

Kiuchi, H. et al., "3.1.3 KSP Data-Acquistion System", Journal of the Communications Research Laboratory, vol. 46, No. 1, Mar. 1999, pp. 25-32.

Lee, J. et al., "SPARP: A Single Pass Antialiased Rasterization Processor", Computers & Graphics 24 (2000), pp. 233-243.

Mitchell, D. P., "Generating Antialiased Images at Low Sampling Densities", Computer Graphics, vol. 21, No. 4, Jul. 1987, pp. 65-72.

Mitchell, D. P., "Spectrally Optimal Sampling for Distribution Ray Tracing", Computer Graphics, vol. 25, No. 4, Jul. 1991, pp. 157-164.

Okumura, A. et al., "Parallel Programming with layered Streams", Symposium on Logic Programming, IEEE, Aug. 1987, pp. 224-232.

Sauceda, A. et al., "Antialiasing Filter with High Pupil Apertures", 18th Congress of the International Commission for Optics: for the Next Millennium, San Fransisco, 1999, SPIE vol. 3749, p. 767.

Schilling, A., "A New Simple and Efficient Antialiasing with Subpixel Masks", Computer Graphics, vol. 25, No. 4, Jul. 1991, pp. 133-141.

Shahin, A. et al., "Cooperation of Fuzzy Segmentation Operators for Correction Aliasing Phenomenon in 3D color Doppler Imaging", Artificial Intelligence in Medicine, vol. 19, No. 2, Jun. 2000, pp. 121-154.

Spero, C. et al., "Corrosion Performance of Mild Steel in Coal Leachate", Materials Forum, vol. 12, Jan. 1988, pp. 73-78.

Waele, S.D. et al., "Error Measure for Resampled Irregular Data", IEEE Transactions on Instrumentation and Measurement, vol. 49, No. 2, Apr. 2000, pp. 216-222.

Wan, M. et al., "Interactive Stereoscopic Rendering of Voxel-based Terrain", Center for Visual Computing and Department of Computer Science State University of New York at Stony Brook, IEEE, Mar. 2000, pp. 197-206.

Yang, X. et al., "Scalable Wavelet Video Coding Using Aliasing-Reduced Hierarchical Motion Compensation", IEEE Transactions on Image Processing, vol. 9, No. 5, May 2000, pp. 778-791.

Zhang, H., "Forward Shadow Mapping", Proceedings of the Eurographics Workshop, Vienna, Austria, Jun. 1998, pp. 131-138, 330.

* cited by examiner

FULL-SCENE ANTI-ALIASING METHOD AND SYSTEM

CROSS-REFERENCE TO RELATED APPLICATION

This application is a divisional of pending U.S. patent application Ser. No. 10/233,106, filed Aug. 28, 2002 now U.S. Pat. No. 6,922,199.

TECHNICAL FIELD

The present invention is related generally to the field of sampled imagery, and more particularly, a system and method for generating anti-aliased sampled images and sampling images by computation or acquisition while reducing aliasing.

BACKGROUND OF THE INVENTION

In computer graphics, input geometry or the like is typically used to represent a scene from which a sampled image is created. A sampled image is a grid, or "raster," of discrete samples referred to as pixels. The pixels are generally arranged along two perpendicular axes corresponding to the horizontal and vertical axes of the image. Rendering a scene is the process of creating such an image of the scene. This process is also called rasterization. The value of a pixel is determined by calculating a sample value from the scene. The rasterized image, represented by the grid of pixels, is typically displayed visually, such as being printed or displayed upon a computer display monitor. The number of pixels and number of colors or values used in rendering a graphics image limit, to some extent, the quality, accuracy, and various characteristics of the image displayed, (for example, the image sampling accuracy, smoothness, detail, and resolution). A great amount of effort has been devoted to developing sophisticated graphics processing, rendering, and sampling methods for improving image quality. Rendering sampled images, however, produces unwanted artifacts. This production is called "aliasing." An "anti-aliased" rendering method aims to reduce objectionable artifacts.

In addition to higher quality static images, rendering high-quality animation depicting visual effects of motion is also desirable. The illusion of motion is created by quickly displaying related images in a sequence in which an object changes appearance slightly. Although the animation of the object may appear to be continuous, each frame of the sequence is a separate image that is displayed momentarily. Thus, the quality of each frame impacts the quality of the overall animation or illusion of motion. Depending upon the method by which the sequence of images is sampled, the resulting representation of motion may result in the creation of motion artifacts. The more noticeable effects include "crawling" and "popping" of pixels on an edge of an object having a color that contrasts sharply with a different colored background.

For example, consider an object of a first color having a straight edge, that appears to be moving across a background of a second color. As the edge of the object moves across the boundary of a pixel, at some point there must be a determination as to how and when the color of the pixel changes from the color of the background to the color of the object. If the value of the pixel is taken from a single sample point, then when the edge of the object passes the sample point of the pixel, the color of the pixel is changed. The location of a single sample point is typically in the center of the pixel, and consequently, the color of a pixel is determined by the color at the center of the pixel. As a result the edge of the object may be well within the region defined by the pixel, but the pixel may still have the color of the background because the edge has not reached the center (i.e., the sample point) of the pixel.

When multiple frames of images are displayed in sequence to provide the illusion of an object in motion, the effect of pixels along the edge of the object "popping" from one color or value to another can be distracting for a viewer. The relative motion of an object with respect to the orientation of the sampling grid of the image may be such that pixels along the edge of the object pop values in a manner and with a regularity that create a visual crawling effect along the edge of the object.

There have been many different approaches to addressing the issue of such aliasing artifacts, including motion artifacts and "staircasing." One such approach is to increase the resolution, or the number of pixels used to represent an image. For example, the available resolution of computer graphics has increased dramatically since the first monochrome computer monitors were developed, and undoubtedly will continue to do so. Similarly, printing devices have ever increasing resolution as well. However, there are practical limitations on the manufacturing of displays and other devices used for recreating an image. Computational limitations must also be considered because there are practical limitations with respect to the amount of data that can be processed in rendering an image. Moreover, no matter how high a resolution is used to represent a graphics image, the image is still nevertheless sampled at discrete intervals, and consequently, subject to some degree of aliasing, including motion artifacts.

Another approach has been to increase the number of values computed for each pixel. More specifically in constructing an image, multi-sampling anti-aliasing systems might use sample values from multiple samples taken at different locations within a pixel in determining the final value of a pixel. As a result, as the edge of a moving object first passes over one of a pixel's sample points, the pixel may take on a different value that is a compromise between the value of the object and that of the disparate background. For example, the pixel might change its value each time the object covers another sample point of the pixel, until all of the sample points share the color of the object, the pixel finally taking on the color of the object, assuming the size, shape, and motion of the object's result in the object gradually and completely covering the pixel.

The multiple samples for each pixel are typically arranged in an ordered pattern, such as in a rectangular grid where the sides of a rectangle defined by the positioned samples are parallel to the axes of the pixels. Previous approaches have also positioned the samples in a (pseudo)-random fashion. Random multi-sampling per pixel generally requires a considerable amount of computational power. As a result, some anti-aliasing algorithms employ sampling patterns which attempt to simulate a random sampling pattern. However, these patterns may require nearly the same computing power as for random multiple sampling per pixel.

Although conventional, multi-sample, full-scene anti-aliasing methods generally do reduce motion artifacts and edge effects, in some situations motion artifacts remain. Full-scene anti-aliasing is antialiased rendering of substantially a fill frame. For example, when an object has an edge parallel to an axis of the sampling pattern and is moving in a direction perpendicular to the edge, a popping effect may be created when the edge of the object passes through multiple sample points simultaneously. Taking more samples per pixel may reduce the severity of multi-sampling motion artifacts, but processing overhead and economic considerations will place practical limits on the maximum number of samples that can be reasonably taken per pixel.

Therefore, there is a need for an alternative system and method for rendering an image from a representation of a scene, while reducing aliasing, such as motion artifacts and edge effects.

SUMMARY OF THE INVENTION

The present invention relates to a method and system for rendering a two- or three-dimensional scene, producing a sampled image, while minimizing aliasing. A scene is rasterized or sampled at a first angle relative to a first coordinate system. The resultant raster, comprising a plurality of pixels, is then rotated at a second angle equal to the inverse of the first angle. An image of the scene is then formed by sampling the pixels in the raster, producing an image that is properly oriented with respect to the first coordinate system. The second rotation may be performed by first applying the pixels to a polygon surface. The pixels may be first converted to a texture map and applied to the polygon surface as a texture. Then this polygon is rotated and rendered. The anti-aliasing technique may also include a super-sampling process, rasterizing the scene to produce a temporary surplus of pixels. To down-sample the number of pixels applied to the polygon surface, bilinear filtering may also be applied, when converting pixels to texels to form a texture map to be applied to the polygon surface. Such anti-aliased rendering may also be repeated on the scene, using two or more different initial angles, rendering two or more separate images that are ultimately combined, to produce a final resultant image. The result of multiple steps described above may be computed in a single step.

DETAILED DESCRIPTION OF THE INVENTION

Embodiments of the present invention render anti-aliased images while reducing artifacts in static images and/or in motion/animation. The systems and methods described herein rasterize a scene at an angle and apply the pixel values from the rasterization to a polygon rendered at the inverse of the angle at which the scene was first rasterized. Embodiments of the invention may be called "rotate-unrotate" rendering. It will be appreciated that the terms "pixel," "pixel value," and "value" will be used herein interchangeably. When the terms are to convey different meanings, it will be apparent from the context. Certain details are set forth below to provide a sufficient understanding of the invention. However, it will be clear to one skilled in the art that the invention may be practiced without these particular details. In other instances, well-known circuits, control signals, timing protocols, and software operations have not been shown in detail in order to avoid unnecessarily obscuring the invention.

Figure 1:
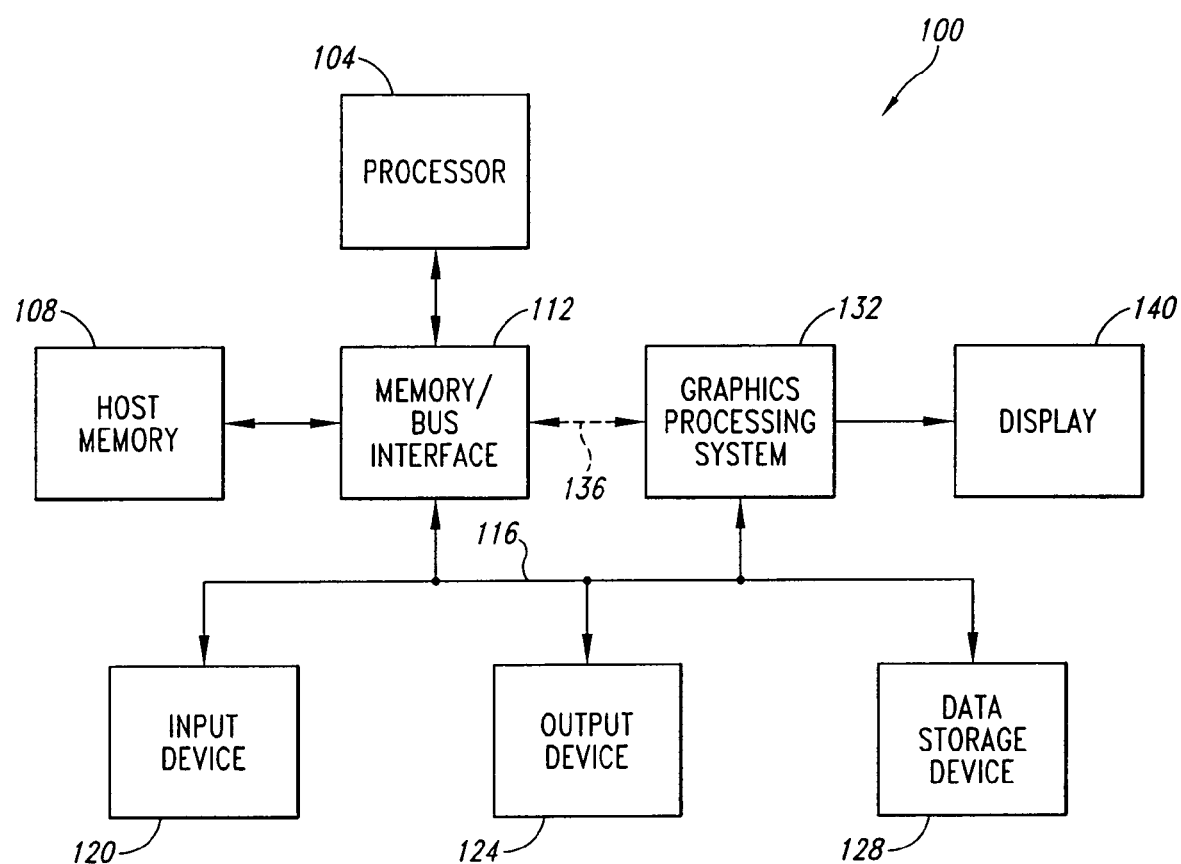
FIG. 1 is a block diagram of a system in which embodiments of the present invention are implemented.

FIG. 1 illustrates a computer system 100 in which embodiments of the present invention are implemented. The computer system 100 includes a processor 104 coupled to a host memory 108 through a memory/bus interface 112. The memory/bus interface 112 is coupled to an expansion bus 116, such as an industry standard architecture (ISA) bus or a peripheral component interconnect (PCI) bus. The computer system 100 also includes one or more input devices 120, such as a keypad or a mouse, coupled to the processor 104 through the expansion bus 116 and the memory/bus interface 112. The input devices 120 allow an operator or an electronic device to input data to the computer system 100. One or more output devices 124 are coupled to the processor 104 to provide output data generated by the processor 104. The output devices 124 are coupled to the processor 104 through the expansion bus 116 and memory/bus interface 112. Examples of output devices 124 include a printer and a sound card driving audio speakers. One or more data storage devices 128 are coupled to the processor 104 through the memory/bus interface 112 and the expansion bus 116 to store data in, or retrieve data from, storage media (not shown). Examples of storage devices 128 and storage media include fixed disk drives, floppy disk drives, tape cassettes and compact-disc read-only memory drives.

The computer system 100 further includes a graphics processing system 132 coupled to the processor 104 and the host memory 108 through the expansion bus 116 and memory/bus interface 112. Optionally, the graphics processing system 132 may be coupled to the processor 104 and the host memory 108 through other types of architectures. For example, the graphics processing system 132 may be coupled through the memory/bus interface 112 and a high speed bus 136, such as an accelerated graphics port (AGP), to provide the graphics processing system 132 with direct memory access (DMA) to the host memory 108. That is, the high speed bus 136 and memory bus interface 112 allow the graphics processing system 132 to read and write host memory 108 without the intervention of the processor 104. Thus, data may be transferred to, and from, the host memory 108 at transfer rates much greater than over the expansion bus 116. A display 140 is coupled to the graphics processing system 132 to display graphics images. The display 140 may be any type of display, such as those commonly used for desktop computers, portable computers, and workstation or server applications, for example, a cathode ray tube (CRT), a field emission display (FED), a liquid crystal display (LCD), or the like.

Figure 2:
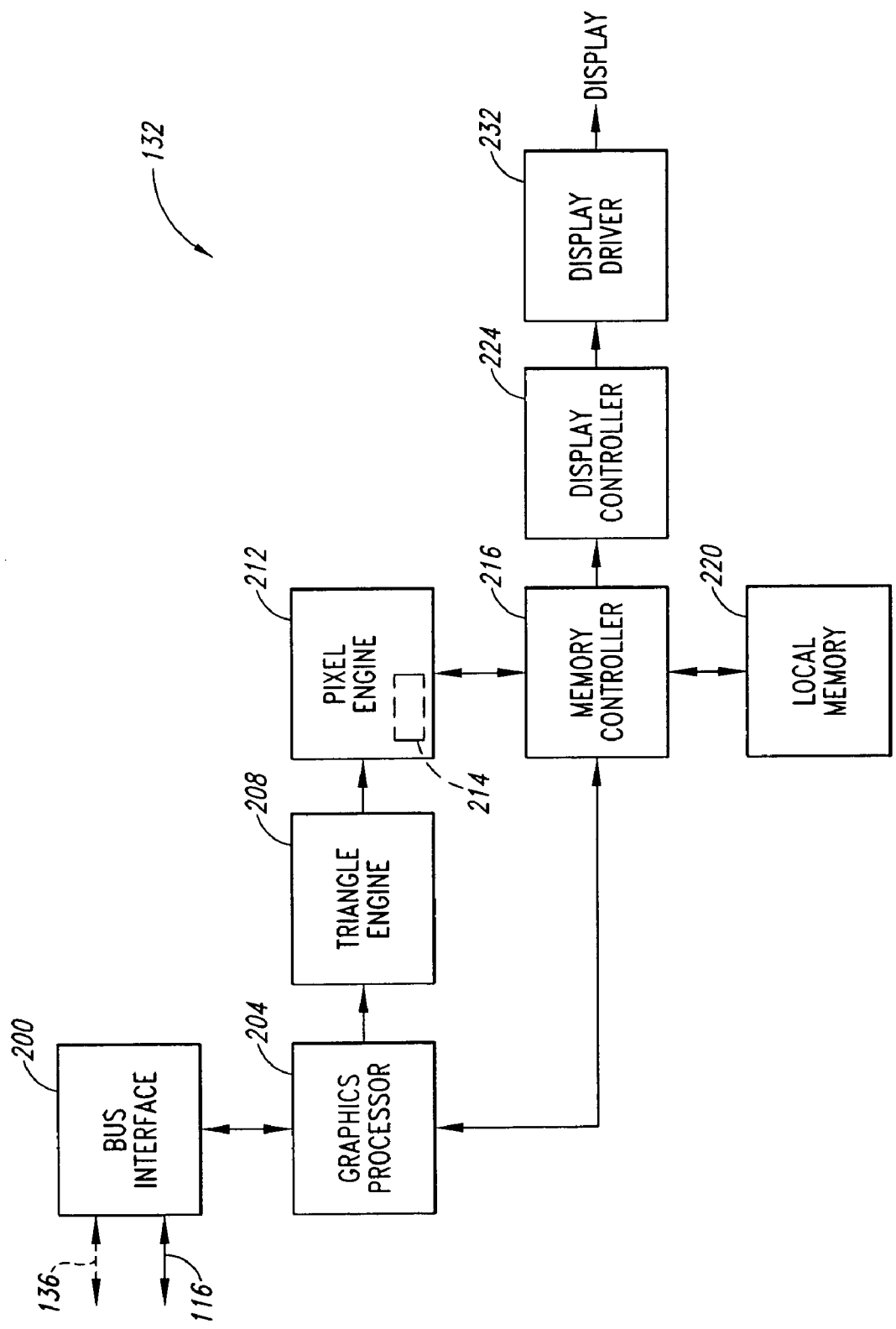
FIG. 2 is a block diagram of a graphics processing system in the system of FIG. 1 according to an embodiment of the present invention.

FIG. 2 illustrates circuitry included within the graphics processing system 132, which performs various three-dimensional (3D) graphics functions. As shown in FIG. 2, a bus interface 200 couples the graphics processing system 132 to the expansion bus 116. In the case where the graphics processing system 132 is coupled to the processor 104 and the host memory 108 through the high speed data bus 136 and the memory/bus interface 112, the bus interface 200 will include a DMA controller (not shown) to coordinate transfer of data to and from the host memory 108 and the processor 104. A graphics processor 204 is coupled to the bus interface 200 and is designed to perform various graphics and video processing functions, such as, but not limited to, generating vertex data and performing vertex transformations for polygon graphics primitives that are used to model 3D objects. The graphics processor 204 is coupled to a triangle engine 208 that includes circuitry for performing various graphics functions, such as scissoring, attribute transformations, rendering of graphics primitives, and interpolation of texture coordinates for a texture map.

A pixel engine 212 is coupled to receive the graphics data generated by the triangle engine 208. The pixel engine 212 contains circuitry for performing various graphics functions, such as, but not limited to, texture application or mapping, bilinear filtering, fog, blending, and color space conversion. The pixel engine further includes texture engine circuitry 214. As will be described in more detail below, the texture engine circuitry 214 is employed in rendering a polygon surface rotated at the inverse of the angle at which a scene was first rasterized.

A memory controller 216 coupled to the pixel engine 212 and the graphics processor 204 handles memory requests to and from a local memory 220. The local memory 220 stores graphics data, such as source pixel values and destination pixel values. A display controller 224 is coupled to the memory controller 216 to receive processed destination values for pixels that are to be displayed. The output values from the display controller 224 are subsequently provided to a display driver 232 that includes circuitry to provide digital color signals, or to convert digital color signals to red, green, and blue analog color signals, to drive the display 140 (FIG. 1).

Although the texture engine circuitry 214 is illustrated as being included within the pixel engine 212, it will be appreciated that the texture engine circuitry 214 may also be a circuit separate from the pixel engine 212, or included in one of the aforementioned circuit blocks of the graphics processing system 132. Therefore, the particular location of the texture engine circuitry 214 is a detail that may be modified without deviating from the subject matter of the invention and should not be used in limiting the scope of the present invention.

Figure 3:
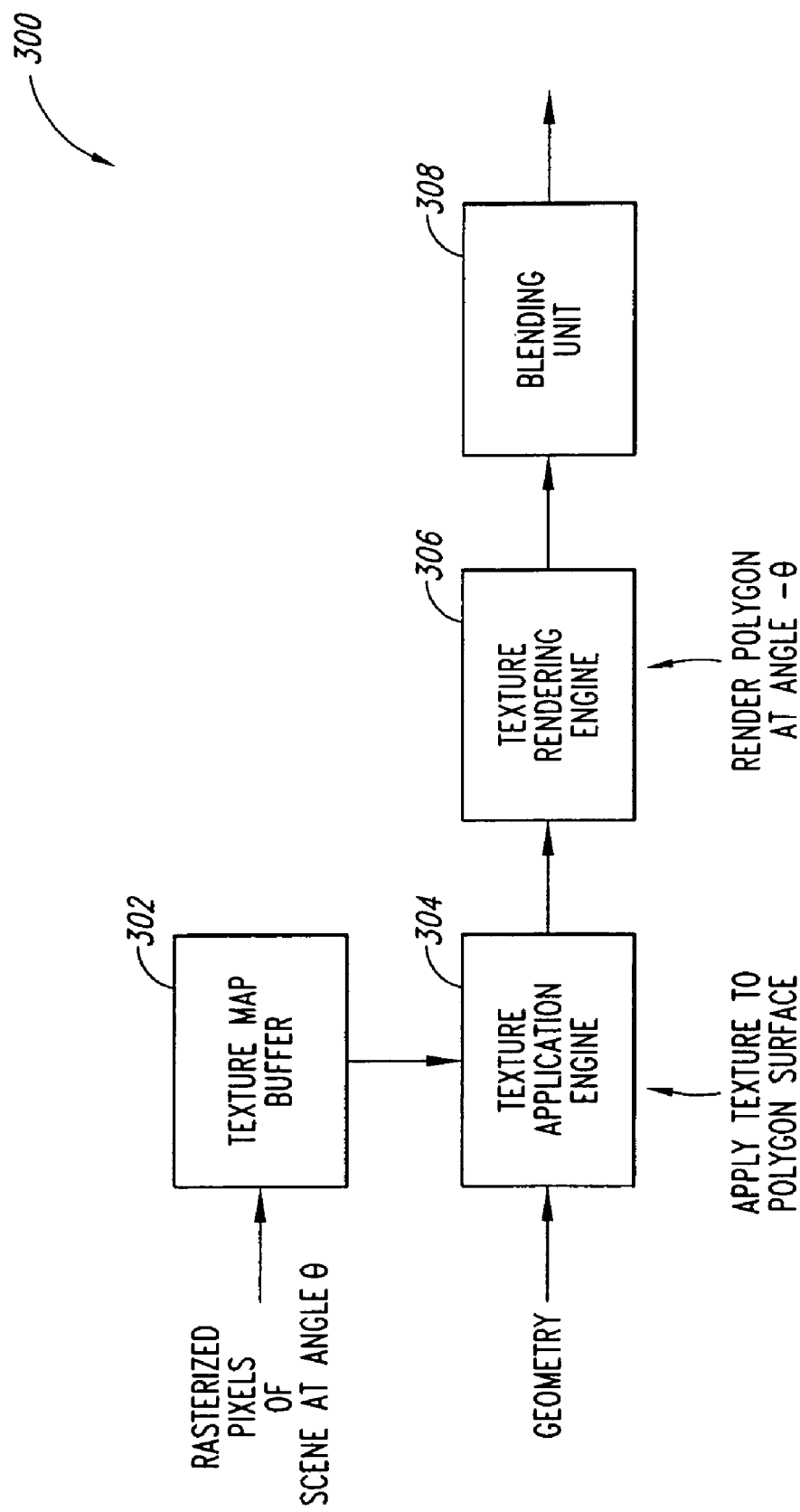
FIG. 3 is a block diagram of a portion of a pixel engine according to an embodiment of the present invention in the graphics processing system of FIG. 2.

A portion of a pixel processing pipeline 300 that may be used for the texture engine circuitry 214 of the pixel engine 212 (FIG. 2) is illustrated in FIG. 3. A texture map buffer 302 stores texel data that are provided to and applied by a texture application engine 304 to surfaces defined by geometry data the texture application engine 304 receives. Following application of a texture map to a surface, a texture rendering engine 306 calculates, from the texture-mapped surface, pixel values that will be used to represent an image. A blending unit 308 may be included as part of the pixel processing pipeline 300 and is used for combining or blending multiple pixel values for each pixel of an image. In this manner, the pixels of multiple images can be overlaid and produce a resultant image where each pixel of the resultant image has a value that is a combination of the multiple values of corresponding, overlying pixels. It may be appreciated that a texture may be "applied" to a surface, simply by defining the geometric relationship between a defined surface and a defined texture map. Operation of the texture engine circuitry 214 in embodiments of the present invention will be explained in more detail below.

As mentioned previously, well-known circuits, control signals, timing protocols, and software operations have not been shown in detail in order to avoid unnecessarily obscuring the invention. However, it will be appreciated that the texture map buffer 302, the texture application engine 304, the texture rendering engine 306, and the blending unit 308 are conventional in design and operation, and the description provided herein is sufficient to enable those of ordinary skill in the art to practice the present invention. In summary, in embodiments of the present invention these elements may be used to render an image of a scene at a particular angle, as part of the operation of embodiments of the invention, or other elements may be used to render the image of a given scene at a particular angle, in the operation of embodiments of the invention. Commonly, these elements are used to render scenes, and these elements could be used to do so, at a selected angle. In the operation of embodiments of the invention, in any case, whatever employment of these elements in the rendering of the scene at a particular angle, they or their analogues are then used to render an image rotated at the inverse angle, of the image rendered at the first angle. It will be appreciated by those of ordinary skill in the art that appropriate control circuits, data paths, and memory, etc. are employed, as necessary.

It will be further appreciated that the sample values calculated during rasterization and applied to the polygon surface may represent values such as color or grayscale at a sample location, and that the sample values for the samples may consist of several different components. For example, a sample value may represent colors which are the combination of red, green, and blue color components. Another example includes sample values representing colors which are the combination of luma and chroma components. Consequently, because it is well understood in the art, although circuitry to perform graphics operation for each of the components is not expressly shown or described herein, embodiments of the present invention include circuitry, control signals, and the like necessary to perform anti-aliased rendering of each component for multi-component sample values.

Figure 4:
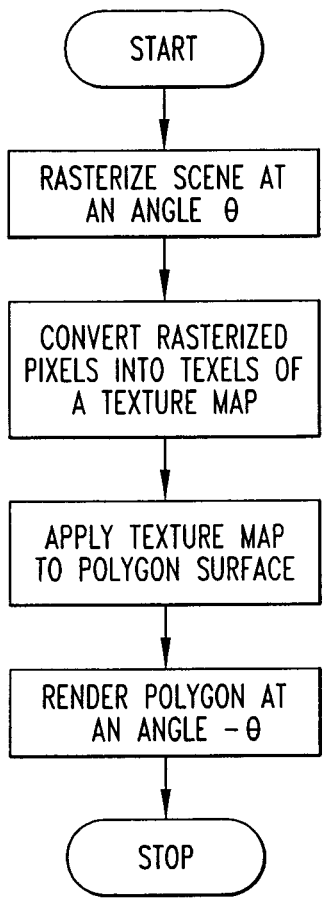
FIG. 4 is a flow diagram of an anti-aliasing technique according to an embodiment of the present invention.

Embodiments of the present invention can use conventional rendering circuitry/software to perform its operation. The operation of the graphics processing system 132 will be described with respect to the flow diagram of FIG. 4. In operation, a scene is rasterized at an angle such that the pixel values that are stored into a back-buffer, within local memory 220, for example, form an image rotated at an angle θ to a first coordinate system. Typically, the first coordinate system is the world space coordinate system where two axes are oriented along the horizontal and vertical directions. Thus, when the rasterization occurs at the angle θ, the image of the scene appears tilted. Were the values stored in the back-buffer to be displayed, the image would appear at an angle. So far, the texture engine may not have been used. However, in alternative embodiments of the present invention, the texture engine may have been used to render any texture-mapped polygons in the scene.

Possibly after format conversion and/or up sampling, the rasterized pixel values are then treated as texel values of a texture map such that the rasterized scene is a texture that may be applied to the surface of a polygon. The texture map is provided to the texture map buffer 302 (FIG. 3) for storage. Geometry data is provided to the texture application engine 304 defining a polygon surface onto which the resulting texture stored in the texture map buffer 302 is applied.

The texture application engine 304 applies the texture map, representing the rasterized scene at an angle θ, to the surface of the polygon,and the texture rendering engine 306 renders the resulting polygon at an angle −θ. That is, the polygon is effectively rotated by the inverse of the initial rasterization angle to correctly reorient the image with respect to the world space coordinates. The rendered polygon, which is now oriented correctly, may be displayed in a conventional visual medium, such as a computer display, a printer, or the like. Typically, the size of the polygon surface will be such that the display window will be filled by the interior of the polygon. However, it will be appreciated that the size, shape, and resolution of the polygon surface may be modified without departing from the scope of the present invention. Additionally, if the surface portion rendered is larger than the final image, the portion of the surface comprising the pixels needed to produce the final image will be extracted. The polygon onto which the texture is applied may have any desired resolution, however, as will be explained in more detail below, the desired resolution of the polygon is typically at least that of the desired output resolution.

It will be further appreciated that the angle $\theta$ can be selected in various manners without departing from the scope of the present invention. For example, the angle $\theta$ can be preprogrammed to a certain value. Alternatively, the angle $\theta$ can be selected from a preselected set of angles. The selection may be made in an ordered fashion or in a random or pseudo-random fashion as well. The preselected angles can be a fixed set of angles or positions calculated in advance, so that choosing an angle from a group of preselected angles will mean that a table of angles is constructed in advance, and then selections from the table are made during anti-aliased rendering. However, it will be further appreciated that, as an alternative, angles or positions could be generated in a constrained or controlled manner, to accomplish a similar result. For example, angles could be generated randomly or pseudo-randomly, and then transformed such that a useful subset of these become the set of preselected angles.

The anti-aliased rendering by embodiments of the present invention reduce polygon popping and other aliasing which might result along the vertical and horizontal axis. When the scene is initially rasterized at the angle $\theta$, the sampling is oriented at an angle with respect to the desired image and the pixels from the rasterization represent an image of the rotated scene. Thus, horizontal and vertical lines in the original scene are now de-emphasized rather than being accentuated by the orientation of the scanlines. The scene is resampled during the rendering of the polygon rotated at an inverse angle of the initial rasterization angle to reorient the image.

Figure 5:
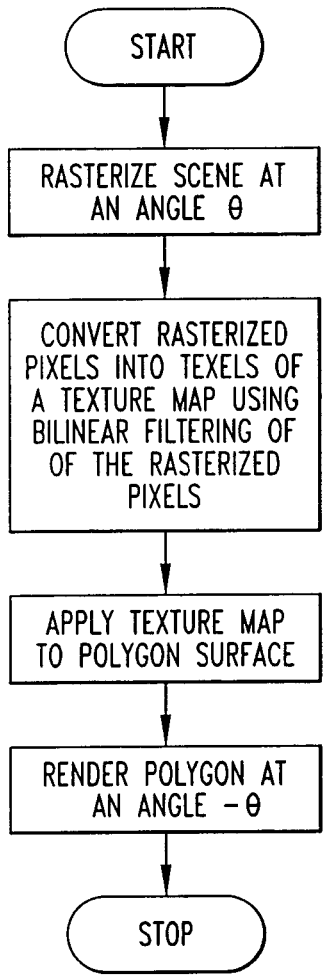
FIG. 5 is a flow diagram of an anti-aliasing technique according to another embodiment of the present invention.

Another embodiment of the present invention is described in the flow diagram of FIG. 5. The anti-aliasing algorithm illustrated in FIG. 5 is similar to that illustrated in FIG. 4, however, rather than constructing the texture map using point-sampling techniques, bilinear filtering is used in converting pixels into a texture map. It will be appreciated by those of ordinary skill in the art, however, that in the embodiment described with respect to FIG. 4, where rasterization is to desired texel locations, point-sampling is not necessary. In the embodiment shown in FIG. 5, as a result of bilinear filtering, artifacts that are introduced when texels of the texture map do not fall on pixel centers are reduced, and the overall appearance of edges in the resulting texture is smoothed further.

Figure 6:
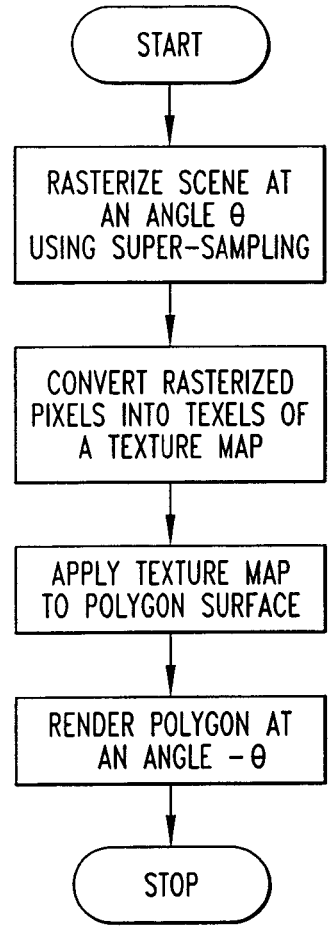
FIG. 6 is a flow diagram of an anti-aliasing technique according to another embodiment of the present invention.

In a similar vein, illustrated in FIG. 6 is another embodiment of the present invention which relies on super-sampling during rasterization of the scene at an angle $\theta$. The surplus of samples calculated during the rasterization of the scene are subsequently down-sampled when rendering the polygon surface. The combination of super-sampling and down-sampling enhances the subjective anti-aliasing quality, and can be efficiently integrated with the initial rasterization and the reorienting rasterization.

Although not shown in FIG. 6, the rotate-unrotate technique that includes super-sampling of a scene may be modified to further include down-or up-sampling when converting the pixels to a texture map. For example, the number of pixels calculated through super-sampling can again be doubled along each dimension of the resulting image to produce approximately four times the number of texels for the texture map or, a bilinear blending technique can be used during application to the surface of the polygon to down-sample the number of texels to the appropriate output resolution.

Figure 7:
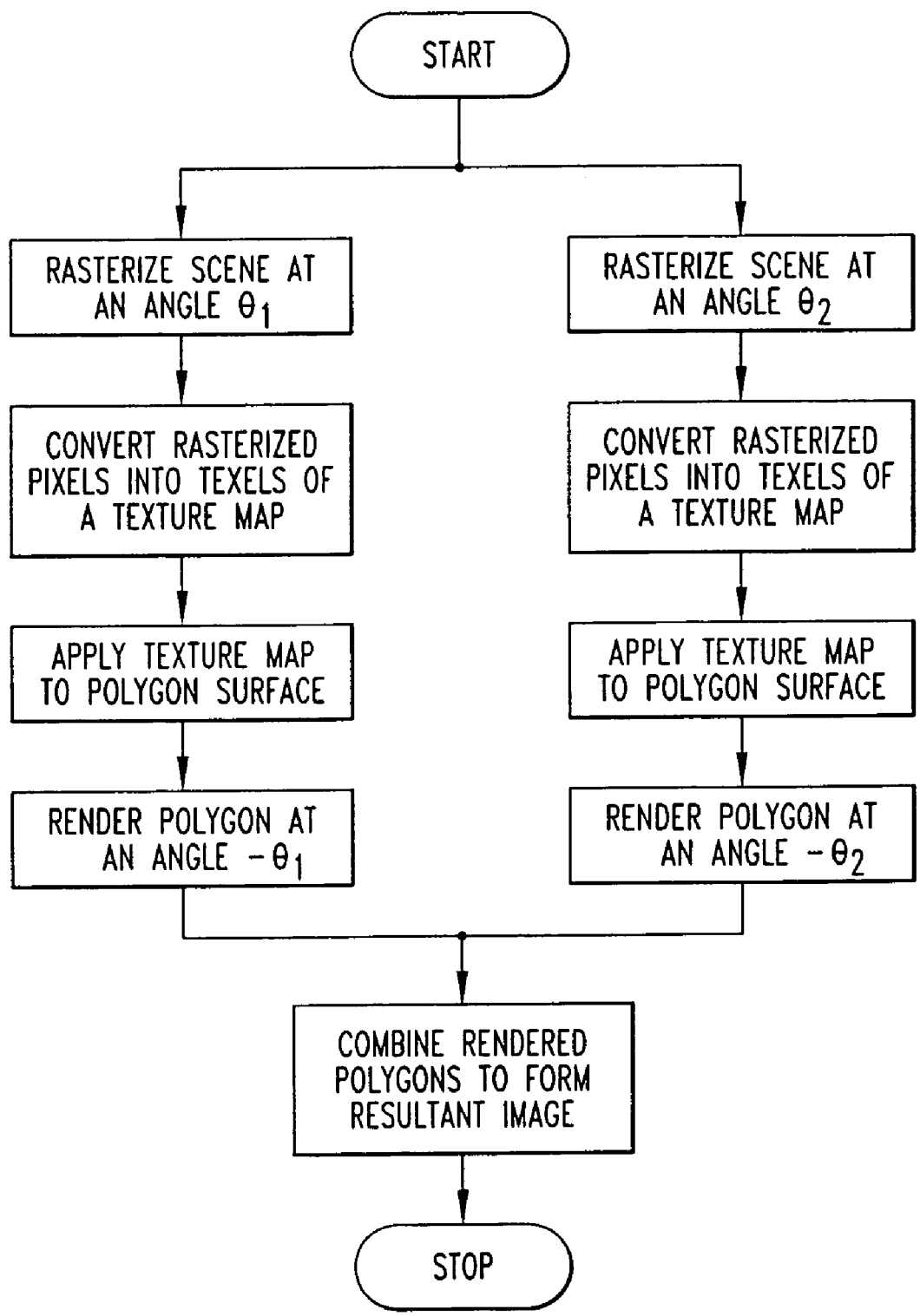
FIG. 7 is a flow diagram of an anti-aliasing technique according to another embodiment of the present invention.

Another embodiment of the present invention is shown in FIG. 7. The anti-aliased rendering illustrated in FIG. 7 is similar to that illustrated in FIG. 4; however, the scene is rasterized at two different angles, $\theta_1$ and $\theta_2$, thus producing two frames of pixels that represent images of the scene, rotated, at the respective angles. Each of the frames of pixels is converted into, or treated as, a texture map of respective texels, which is subsequently applied to a respective polygon. Each polygon is then rendered as if rotated by the inverse of the respective initial rasterization angle. Both images now appear in the same orientation. The resulting images are then aligned and combined to produce a final image.

The values of the two respective rendered polygons can be combined in a variety of methods. For example, in one method of combining the values of the rendered polygons, the values of the first and second renderings are averaged to provide values for the pixels of the resultant image. Thus, an aliasing artifact at one location in the first image may be due to the angle in that the second image at the second angle may contain less aliasing at that same location. The averaging minimizes the degree of aliasing at such locations.

Another approach to combining the rendered images is to use an alpha-blending technique, where the pixels of the rendered polygons are overlaid and the respective opacity or alpha values are adjusted to yield composites for the pixels of the resultant image. In the case where the pixels are alpha-blended, the values of correspondingly located pixels are scaled by their respective alpha values, and then the scaled values are summed together to yield a resulting value for each pixel. However, other alpha- or opacity-blending techniques may be applied as well.

Still another method of combining the rendered images is to interlace or display in an alternating sequence the rendered images. Video interlacing can be used to effect a blending of multiple frame buffers. In conventional NTSC television, each interlaced video frame consists of two images called "fields." Each field is the even or odd lines of the image. When displaying video, the television updates each field every $\frac{1}{60}^{th}$ of a second. If the pixels from one frame buffer are used as the first field, while pixels from a different frame buffer are used for the second field, the interlacing apparatus will construct an output image which is a combination of both input images. Another similar technique for blending multiple frames involves displaying the unblended frames at a rate sufficient for the human eye to fuse images together.

Combining pixels of n framebuffers: the values are combined by summing the respective values, each having been multiplied by a respective weight. The set of weights comprises one weight for each of the images, each typically rendered at a different angle. This sum can be expressed by the following formula:

$$P_{combination} = w_0*P_0 + w_1*P_1 + w_2*P_2 + \ldots w_n*P_n$$

where $w_i$ is the ith filter weight and the $P_i$ are corresponding pixels, each from its own image.

In general, it is expected that the filter is normalized. That is, the sum of the set of weights should be equal to one (sometimes referred to as "unity"). It is possible, however, that some applications will use weights that sum to less than one, or greater than one, as in a special effect. Although this technique appears very similar to the mathematical construction of alpha blending, with alpha blending, the term alpha is conceptually used to refer to the "coverage" of the pixel.

Another blending or combining technique uses logic operators. In this blending method, values are combined by the use of a logical expression. The logical expression is applied to each bit of the value of a pixel. This has the effect that individual portions of the pixel value may be selected or masked on a per-bit basis. This particular method will have applications where image mattes are used. For example, blended output=$P_1$ AND $P_2$; or blended output=$P_1$ AND NOT $P_2$ It will be appreciated that the techniques described herein for combining the multiple rendered images are exemplary, and do not provide a comprehensive recitation of all possible combining alternatives. Consequently, the particular technique for combining the multiple rendered images should not be interpreted as limiting the scope of the present invention, except to the extent the limitation is recited in the claims appended hereto.

As previously described, in the embodiment of the invention illustrated in FIG. 7, a scene is rasterized at both a first and a second angle. It should be noted that the time at which the scene is rasterized at the first and second angles may be at the same instant, or at two different instants. That is, the "same instant" is not intended to mean that the scene is simultaneously rasterized at the two different angles, but rather, the scene has not advanced or changed from the time rasterization at the first angle occurs and when rasterization at the second angle occurs. Thus, rasterization at the first and second angles capture the scene at identical moments in time.

In contrast, rasterizing at the two angles at different instants is intended to mean that the scene has changed from when the rasterization at the first angle occurs and when the rasterization at the second angle occurs. In this manner, a sequence of frames can be created and blended together. After two initial frames are rasterized and blended, a subsequent rasterized frame can be blended with the previous, single, non-composite image, thus, two consecutive frames are blended together for each output frame. As a result, when scene geometry moves at high speeds, the motion will tend to appear smoother, while motion at lower speeds will yield more anti-aliasing.

Although the embodiments of the invention described with respect to FIG. 7 have been described as combining only two different renderings resulting from the rasterization of a scene at two different angles, it will be appreciated that any plurality of renderings can be combined to form the resultant image. Combining more than two renderings may result in a resultant image having higher visual quality; however, processing capabilities and resources of the graphics processing system should be considered.

It will be further appreciated that multiple frames of texels and pixels may be combined using various alternative techniques to form a resultant image and still remain within the scope of the present invention. For example, the embodiment shown in FIG. 7 combined the frames of pixels following the rendering of the polygon surfaces. However, the multiple frames could alternatively be combined by averaging the values of corresponding texels in the multiple texture maps prior to being applied to the polygon surface. That is, the texel values of a texel applied to the polygon is the average of the texel values for correspondingly located texels of the multiple texture maps.

Embodiments of the present invention have been described to this point as separate variations of embodiments of the present invention. It will be appreciated, however, that the various embodiments so described can be combined to provide additional alternative embodiments of the present invention. For example, anti-aliased rendering according to embodiments of the present invention can include supersampling during the initial rasterization of the scene as well as bilinear filtering when converting pixels to a texture map. Similarly, bilinear filtering and rasterization at multiple angles can be combined to produce another embodiment. Thus, embodiments resulting from the combination of the embodiments particularly described herein remain within the scope of the present invention.

From the foregoing it will be appreciated that, although specific embodiments of the invention have been described herein for purposes of illustration, various modifications may be made without deviating from the spirit and scope of the invention. For example, embodiments of the present invention have been described as being implemented in portions of the pixel engine 212 (FIG. 2) and performed by using conventional processing stages typically included in graphic processing systems. The ability to implement the present full-scene anti-aliased rendering invention with conventional processing stages is an advantage which the present invention provides. However, it will be appreciated that embodiments of the present invention may also be implemented in circuitry dedicated to performing full-scene anti-aliasing as described herein. Additionally, although the present invention has been described as being implemented in hardware embodiments, it will be appreciated that the present invention may also be implemented in software embodiments, or combinations of hardware and software. It will be further appreciated by those of ordinary skill in the art that embodiments of the present invention are not limited to implementation in a computer system. For example, embodiments of the present invention can be implemented in game machines, cellular phones, and other systems where rendering of anti-aliased images would be desirable. Accordingly, the invention is not limited except as by the appended claims.

The invention claimed is:

1. A method for performing anti-aliased rendering of a scene, comprising:
   storing sample values for some pixels of an image representing the scene rotated at a first angle relative to a first coordinate system;
   calculating from the image, some texel values for a texture map applied to a surface; and
   rendering some of the texture-mapped surface at a second angle equal to the inverse of the first angle.

2. The method of claim 1 wherein the first and second angles are measured about an axis of rotation perpendicular to a viewing plane in which the scene is rendered.

3. The method of claim 1, further comprising rasterizing the scene to generate the sample values.

4. The method of claim 1, further comprising retrieving data stored in a memory and calculating the sample values from the retrieved data.

5. The method of claim 1 wherein calculating texel values comprises filtering the pixels.

6. The method of claim 1 wherein calculating texel values comprises bilinearly filtering the pixels.

7. The method of claim 1 wherein the first angle is randomly or pseudo-randomly selected.

8. The method of claim 1 wherein the first angle is randomly or pseudo-randomly selected from a group of preselected angles.

9. A method for rendering full-scene anti-aliasing, comprising:
 calculating pixel values for some pixels of an initial image representing the scene rotated at a first angle relative to a first coordinate system;
 generating a texture map from some of the pixel values;
 applying the texture map to a surface; and
 rendering the texture-mapped surface at a second angle equal to the inverse of the first angle.

10. The method of claim 9 wherein the first and second angles are inverses with respect to being measured about an axial point of rotation in the viewing plane in which the scene is rendered.

11. The method of claim 9 wherein calculating comprises rasterizing the scene to generate the pixel values.

12. The method of claim 9, further comprising retrieving data stored in a memory, from which the pixel values are calculated.

13. The method of claim 9 wherein the resolution of the texture-mapped surface on which the texture map is applied is at least equal to or greater than the resolution desired from rendering the texture-mapped surface.

14. The method of claim 9, further comprising calculating more pixel values for the initial image than there are in the image produced by rendering the texture-mapped surface.

15. The method of claim 9 wherein generating a texture map comprises filtering some of the pixel values to calculate some texels of the texture map.

16. The method of claim 9 wherein generating a texture map comprises bilinearly filtering some of the pixel values to calculate some texels of the texture map.

17. The method of claim 9 wherein the pixels of the initial image are arranged according to first and second axes and generating a texture map comprises doubling the number of pixels along each axis.

18. The method of claim 9 wherein the first angle is randomly or pseudo-randomly selected.

19. The method of claim 9 wherein the first angle is randomly or pseudo-randomly selected from a group of preselected angles.

* * * * *